US008081955B2

(12) United States Patent
Davis et al.

(10) Patent No.: US 8,081,955 B2
(45) Date of Patent: Dec. 20, 2011

(54) MANAGING CONTENT TO CONSTRAINED DEVICES

(75) Inventors: William James Davis, Kitchener (CA); Niranjan Mayya, Mississauga (CA); Grzegorz J. Padiasek, Mississauga (CA); Mohan Krishna Rao, Mississauga (CA); Jay David Steele, Fall River (CA)

(73) Assignee: Research In Motion Limited, Waterloo (CA)

( * ) Notice: Subject to any disclaimer, the term of this patent is extended or adjusted under 35 U.S.C. 154(b) by 259 days.

(21) Appl. No.: 11/584,474

(22) Filed: Oct. 19, 2006

(65) Prior Publication Data

US 2007/0130589 A1 Jun. 7, 2007

Related U.S. Application Data

(60) Provisional application No. 60/729,066, filed on Oct. 20, 2005.

(51) Int. Cl.
*H04M 3/42* (2006.01)
(52) U.S. Cl. ............... 455/414.1; 455/411; 715/205; 715/719; 709/247; 709/225; 370/335
(58) Field of Classification Search ............... 355/24, 355/9; 514/338; 709/246; 725/38; 455/436, 455/414; 424/439
See application file for complete search history.

(56) References Cited

U.S. PATENT DOCUMENTS

| 5,566,469 A | 10/1996 | Bolton |
| 6,418,627 B1 | 7/2002 | Tsunoda |
| 6,496,692 B1 * | 12/2002 | Shanahan ............ 455/418 |
| 6,907,501 B2 | 6/2005 | Tariq et al. |
| 7,246,164 B2 * | 7/2007 | Lehmann et al. ............ 709/225 |
| 7,526,493 B2 * | 4/2009 | Betts et al. ............ 1/1 |
| 2001/0044835 A1 * | 11/2001 | Schober et al. ............ 709/217 |
| 2001/0056404 A1 * | 12/2001 | Kuriya et al. ............ 705/51 |
| 2002/0010798 A1 * | 1/2002 | Ben-Shaul et al. ............ 709/247 |
| 2002/0016801 A1 | 2/2002 | Reiley et al. |

(Continued)

FOREIGN PATENT DOCUMENTS

GB 2411331 8/2005

(Continued)

OTHER PUBLICATIONS

Holmes, "RSS: How to Pull the News That Matters", Internet Newsletter for Lawyers, pp. 1-12, May 2004.

(Continued)

*Primary Examiner* — Nick Corsaro
*Assistant Examiner* — Mahendra Patel
(74) *Attorney, Agent, or Firm* — Geoffrey deKleine; Borden Ladner Gervais LLP (57) ABSTRACT

Content is managed and delivered to mobile devices, often through a wireless network. Mobile devices have content management software containing instructions to receive and manage content at the mobile device. Content management servers select and manage content and transmit content to the mobile devices, receiving requests for content, and up-to-date information regarding quantity of content to be transmitted. Up-to-date information regarding quantity is repeatedly sent and received, and content is repeatedly selected and transmitted using the information to make selections. Specific embodiments provide methods, systems, and devices for automatically managing content to increase the probability that the user is gaining access to the content they want to see and for decreasing the chance that the delivery of content is tying up limited resources of mobile devices.

8 Claims, 8 Drawing Sheets

U.S. PATENT DOCUMENTS

| | | |
|---|---|---|
| 2003/0032409 A1* | 2/2003 | Hutcheson et al. ............ 455/414 |
| 2003/0061611 A1* | 3/2003 | Pendakur ......................... 725/46 |
| 2003/0110503 A1* | 6/2003 | Perkes ............................. 725/86 |
| 2004/0003097 A1* | 1/2004 | Willis et al. .................... 709/228 |
| 2004/0015777 A1* | 1/2004 | Lei et al. ........................ 715/500 |
| 2004/0054923 A1* | 3/2004 | Seago et al. .................... 713/201 |
| 2004/0110490 A1 | 6/2004 | Steele |
| 2004/0153962 A1* | 8/2004 | Bazoon ........................... 715/500 |
| 2004/0199604 A1* | 10/2004 | Dobbins et al. ................ 709/217 |
| 2004/0205528 A1* | 10/2004 | Alexander ...................... 715/505 |
| 2005/0079301 A1 | 4/2005 | Hartleben et al. |
| 2005/0154996 A1 | 7/2005 | Othmer |
| 2005/0210506 A1* | 9/2005 | Benliyan ......................... 725/46 |
| 2005/0265345 A1* | 12/2005 | Chen et al. ..................... 370/392 |
| 2006/0101489 A1* | 5/2006 | Roden et al. .................... 725/42 |
| 2006/0112167 A1 | 5/2006 | Steele |
| 2006/0129917 A1 | 6/2006 | Volk et al. |
| 2006/0161635 A1* | 7/2006 | Lamkin et al. ................. 709/217 |
| 2006/0161686 A1* | 7/2006 | Mossakowski ................. 709/247 |
| 2006/0173974 A1 | 8/2006 | Tang |
| 2006/0184617 A1 | 8/2006 | Nicholas et al. |
| 2006/0235885 A1 | 10/2006 | Steele et al. |
| 2006/0253780 A1* | 11/2006 | Munetsugu et al. ........... 715/719 |
| 2007/0049296 A1* | 3/2007 | Gupta et al. ................. 455/456.5 |
| 2007/0060099 A1* | 3/2007 | Ramer et al. ................... 455/405 |
| 2007/0067507 A1* | 3/2007 | Ohtsubo et al. .................. 710/33 |
| 2007/0088838 A1* | 4/2007 | Levkovitz et al. ............. 709/228 |
| 2007/0237133 A1* | 10/2007 | Woods et al. .................. 370/352 |

FOREIGN PATENT DOCUMENTS

| | | |
|---|---|---|
| WO | 2005094038 | 10/2005 |

OTHER PUBLICATIONS

McGreal et al., "Implementing Mobile Environments Using Learning Objects: The Athabasca University Digital Reading Room", IEEE International Workshop on Wireless and Mobile . . . .

* cited by examiner

MANAGING CONTENT TO CONSTRAINED DEVICES

CLAIM OF PRIORITY

This patent application claims priority to, and incorporates by reference, U.S. provisional patent application 60/729,066, titled: Managing Content to Constrained Mobile Devices over Wireless Networks, by Jay Steele, et al., which was filed on Oct. 20, 2005.

FIELD OF INVENTION

This invention relates to apparatuses, systems, and methods for delivery and distribution of content through computer communications systems.

BACKGROUND OF THE INVENTION

In recent years there has been a rapid increase in the production and adoption of mobile data communications devices and services in the worldwide marketplace. Wireless networks and operational capabilities potentially allow users to carry the devices almost anywhere and to use them to obtain and store electronic data. With the ability to employ data protocols such as HTTP (for Internet), POP/IMAP (for mail) and GSM (for voice), these devices have significant communications versatility. These devices typically have user input components, for instance, phone keypads and joysticks. Some have full keyboards, which enhance their communications capability.

Various devices employ specific wireless capabilities and subscribe to wireless services to improve their functionality and efficiency, including using certain data transports to link the device to a land-based server. Of the various wireless services, some allow data to be sent, or pushed, to a mobile device from a land-based server with or without any initiating request from the mobile device. Because these devices are typically accessible using standard Internet protocols, they are capable of communicating and interacting with most of the standard technologies and services in use with personal computers such as the various Microsoft Windows operating systems or Apple Mac OS X operating systems, and their various associated functions and applications.

Within this environment, technologies such as the HTTP (Hypertext Transfer Protocol), HTML (Hypertext Markup Language) and XML (extensible Markup Language) have helped to standardize the way devices and people communicate. For instance, XML is quickly becoming the foundation for allowing computer-based services to communicate with each other. One form of XML called RSS (Really Simple Syndication) allows news articles to be published in a standard format. Presently, RSS-based news articles are widely available on the Internet, used by everything from personal web logs to commercial news agencies. In addition to RSS, other competing news syndication formats also exist, including Atom.

RSS communicates news articles in a digitized data format through data feeds in machine readable formats to be read and processed by receiving devices, which may be computers or other programmable nodes, which then format the news articles to be read by users. Applications such as RSS Readers or RSS Aggregators have been developed for most popular computing platforms (such as Microsoft Windows and Mac OS X) operating the receiving devices. These applications allow users to subscribe to RSS data feeds, poll the feeds to see when new articles are available, and present the feeds in a user readable format. Typically, dedicated applications for reading news data feeds poll feeds at regular intervals (once an hour, for example) to retrieve available news articles and their updates. Web-based RSS aggregators read RSS data feeds and present the articles in a readable HTML format within a web browser. In addition, RSS is increasingly becoming the preferred transport for newer web technologies like podcasting and video podcasting, essentially syndicating references to larger audio and video streams in addition to simple text.

With respect to receiving news data feeds, and presenting these in a user readable format, mobile data communication devices have limitations that differentiate them from personal computers, for example. These include limitations on the amount of memory, the speed of the central processing unit, the physical size of the display, the physical size of the input devices, the speed and cost of network communication, and the power source and battery life, among others. As such, the rise in popularity of RSS, podcasting and video podcasting technology has exposed a number of shortfalls in its application to and communications with mobile devices.

Users subscribe to RSS-based content, and the content can be delivered to the mobile device without the user explicitly asking for it at that specific moment (much like a mailman can place a newspaper or magazine in your mailbox for retrieval). As mentioned above, mobile devices are often much more constrained than desktop computers. Specifically they usually have a much lower storage capacity capable of storing information. Additionally, stressing those resources (for example, by storing a lot of content on a device) can often impact the performance and usability of the device to the point where it is no longer useful.

Therefore, for services that exists where users can subscribe to content and have it automatically delivered to the device, there is a need or potential for benefit for ways of automatically managing the content to improve or maximize the possibility that: a) the user is gaining access to the content they want to see, and b) the delivery of content is not stressing the resources of the mobile device. As examples, needs and potential for benefit exist for methods for delivering content to mobile devices, and for mobile devices for receiving content through a wireless communications network, wherein the mobile device contains content management software containing instructions that facilitate efficient content management and delivery to the user. Potential for improvement exists in these and other areas that may be apparent to a person of skill in the art having studied this document.

SUMMARY OF PARTICULAR EMBODIMENTS OF THE INVENTION

This invention provides, among other things, methods of delivering content to mobile devices, and mobile devices with content management software containing instructions to receive content at the mobile device. Various embodiments of the invention provide as an object or benefit that they partially or fully address one or more of the needs, potential areas for improvement or benefit, or functions described herein, for instance. Specific embodiments provide as an object or benefit, for instance, that they provide methods, systems, or devices for automatically managing content to increase the probability that the user is gaining access to the content they want to see and for decreasing the chance that the delivery of content is tying up limited resources of the mobile device.

In specific embodiments, the invention provides various methods of delivering content to a plurality of mobile devices. In various of these embodiments, such a method may include at least certain steps, which may include a step of receiving requests for content from users of the mobile devices, and the requests may include criteria for selecting content. Such methods may also include for each of the mobile devices, steps of receiving up-to-date information from the mobile device regarding a quantity of content that the mobile device is prepared to receive, selecting a select set of content using the criteria and the information, and transmitting the select set of content to the mobile device. In many embodiments, such a method may involve repeating at least a plurality of times the steps of receiving the up-to-date information, selecting the select set of content, and transmitting the select set of content.

In certain embodiments, for at least some of the mobile devices, the step of receiving requests for content may include receiving identification of a plurality of channels, the step of selecting a select set of content may include selecting content corresponding to the plurality of channels, and the step of selecting a select set of content may include selecting a plurality of articles, each article including a title, a short description, and a long description, for example. Further, in some embodiments, a method may include a step of a content management server selecting a master set of content based on the criteria, wherein at least some of the master set of content is selected based on the criteria before the step of receiving the up-to-date information occurs, after which the up-to-date information is used to choose part of the master set of content to form the select set of content to send to the mobile device. In a number of embodiments, the step of receiving the up-to-date information includes receiving from the mobile devices an indication of a maximum number of items to be transmitted, an amount of memory of the mobile device, a minimum number of items to be transmitted for each of a plurality of channels, and an identification of the last item received by the mobile device in a previous step of transmitting a select set of content to the mobile device.

In some embodiments, the steps of receiving the up-to-date information, selecting the select set of content, and transmitting the select set of content, are performed without being initiated by the user at the mobile device at the time the content is delivered. On the other hand, in a number of embodiments, the step of transmitting the select set of content is initiated by the content management server based on new content being available. Further, in some embodiments, the steps of receiving the up-to-date information, selecting the select set of content, and transmitting the select set of content, are performed periodically at substantially regular intervals of time, while in some embodiments, the steps of receiving the up-to-date information and transmitting the select set of content, are initiated by the user through the mobile device when the user desires the select set of content.

In certain embodiments where (for at least some of the mobile devices) the step of receiving requests for content includes receiving identification of a plurality of channels and the step of selecting a select set of content includes selecting content corresponding to the plurality of channels, the steps of receiving the up-to-date information and transmitting the select set of content, are initiated by the user through the mobile device for a single channel when the user desires the select set of content for that single channel, and the step of transmitting the select set of content is restricted to that same single channel. Further, in a number of embodiments, the step of selecting a select set of content includes giving priority to content based on age, such that newer content is given higher priority.

In particular embodiments that include a step of selecting a master set of content based on the criteria, for at least some of the mobile devices, the step of receiving requests for content includes receiving identification of a plurality of channels, and receiving identification of a minimum quantity of content desired for each of the channels. In addition, in this embodiment, at least some of the master set of content is selected based on the criteria before the step of selecting the select set of content. Furthermore, in these particular embodiments, the up-to-date information is used to choose part of the master set of content to form the select set of content to send to the mobile device, the step of selecting a select set of content includes selecting content corresponding to the plurality of channels, and the step of transmitting the select set of content includes transmitting at least the minimum quantity of content desired for each of the channels.

Some of the embodiments may further include a step of (for at least some of the mobile devices) selecting a master set of content based on the criteria, such that at least some of the master set of content is selected based on the criteria before the step of selecting the select set of content. In such embodiments, the up-to-date information may be used to choose part of the master set of content to form the select set of content to send to the mobile device. And in many embodiments, the method further includes a step of identifying to not be delivered in the future, all of the master set of content that is not initially selected to form the select set of content.

Still further, in some methods, at least some of the mobile devices have a particular amount of memory and an indication of the amount of memory (for at least some of the mobile devices) is included in the criteria mentioned above, in the up-to-date information, or both. Further, in some embodiments, the content includes a plurality of items and at least some of the items include a plurality of parts. For at least some of the mobile devices, in some embodiments, the step of selecting the select set of content includes selecting a portion of the parts of the items based on the indication of the amount of memory. In some such embodiments, at least some of the items within the select set of content include at least a title and a description, and for at least a portion of the mobile devices, the amount of memory is less than a predetermined threshold.

Further, for certain mobile devices where the amount of memory is less than the predetermined threshold, the step of transmitting the select set of content includes transmitting only the title of each item within the select set of content. And, in some embodiments, the method further includes, at least for some of the mobile devices where the amount of memory is less than the predetermined threshold, a step of transmitting the description of at least one item upon demand from the user through the mobile device. Even further, in certain embodiments, at least some of the items within the select set of content include at least a short description and a long description and the step of transmitting the description includes transmitting the long description of at least one item upon demand from the user through the mobile device.

In other embodiments, the invention also provides a mobile device for receiving content through a wireless communication network. In such embodiments, the mobile device may include content management software that includes instructions to transmit up-to-date information from the mobile device to a content management server via the wireless communication network, and this information may identify a quantity of content that the mobile device is prepared to receive. This software may also include instructions to receive a select set of content at the mobile device from the management server via the wireless communication network and repeat, at least several times, the instructions to transmit the up-to-date information and receive the select set of content. In some embodiments, the content management software includes instructions to receive content in more than one channel, where each channel may include a plurality of items, and each item may include a title, a short description and a long description, for example. Further, in some embodiments, the content management software further contains instructions to sort the previously received content according to priority and delete at least some of the lowest priority content to make room for the select set of content.

In various embodiments, the content comprises a plurality of articles and the content management software contains instructions to assign a higher priority to more-recent articles than to older articles. In addition, in some embodiments, the content management software contains instructions to assign a higher priority to unread articles than to articles that have been read, instructions to assign a higher priority to saved articles than to unread articles, or both. Furthermore, in some embodiments, the content management software contains instructions to sort the previously received content in a plurality of channels, where each channel has a limit for a minimum quantity of content. Moreover, in some embodiments, the content comprises a plurality of items, at least some of which have a plurality of parts, and the content management software contains instructions to organize the items into handles, each handle representing at least one part of an item.

Further, in some embodiments, the content management software contains instructions to assign a priority to each of the handles for at least some of the items, and in at least some cases, the priority assigned to one handle is different than the priority assigned to another handle for the same item. Even further, in some embodiments, the content management software further contains instructions to sort the handles according to priority and delete at least some of the lowest priority content to make room for the select set of content. Further still, in some such embodiments, the content management software further contains instructions to fetch the part from the content management server when the user requests the part and the handle has been deleted.

Different embodiments of the invention include various combinations of the features and limitations described herein, and different embodiments have a variety of objects and provide different benefits, some of which may be apparent to a person of skill in the art.

BRIEF DESCRIPTION OF THE DRAWINGS

The drawings illustrate, among other things, various particular examples of embodiments of the invention, and certain characteristics thereof. Different embodiments of the invention include various combinations of elements shown in the drawings, described herein, known in the art, or a combination thereof.

DETAILED DESCRIPTION OF EXAMPLES OF EMBODIMENTS

In certain situations, because of the memory and storage constraints of mobile devices, improvements are needed, or would be beneficial, for managing content on the device, before the content arrives at the device, or both. As an example, in some embodiments of a mobile application, content is "subscribed" and continually arriving on the device, without being explicitly requested by the user. This means that as new content arrives, often content needs to be automatically removed from the device to make sure there is enough storage on the device to accommodate any newly arriving content. A number of different examples are described herein, and embodiments of the invention may include aspects of one or more of the examples provided.

This invention provides, among other things, methods of managing, sorting, selecting, delivering, and receiving content, software for performing such functions, and apparatuses or devices for performing such functions. Examples include mobile devices having particular software, and methods of delivering content to mobile devices. Certain embodiments automatically manage content to facilitate the user gaining access to the content they want to see and to at least partially avoid tying up limited resources of the mobile device. In various embodiments, a user subscribes to or requests content to be sent to his mobile device. In some embodiments, this content may concern a number of channels, and a management server may collect content for delivery. The mobile device may transmit up-to-date information to identify a quantity of content that the mobile device is prepared to receive, and the server may select certain content requested in accordance with the up-to-date information, and send it to the mobile device.

Figure 1:
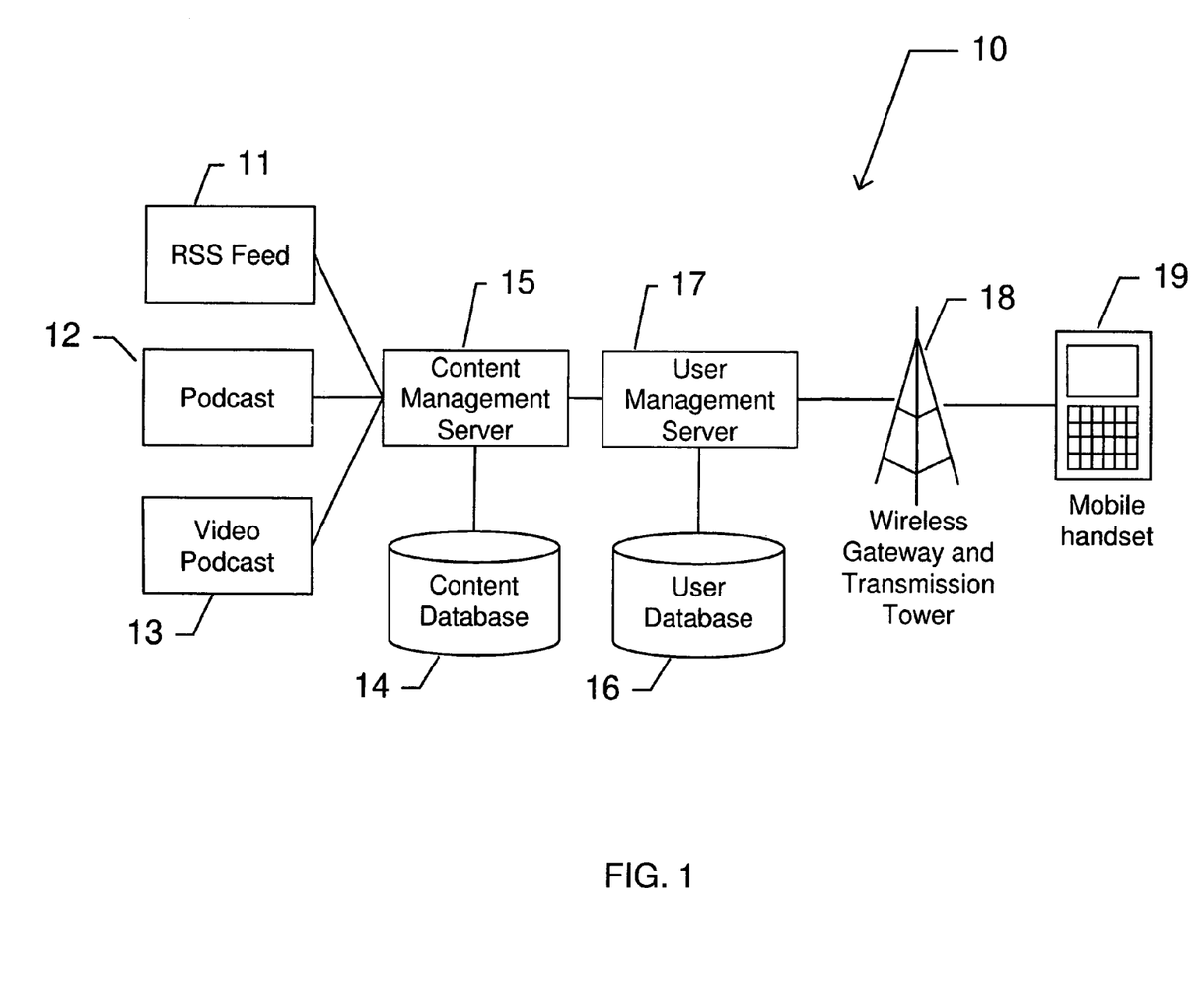
FIG. 1 is a block diagram that illustrates an example of a system in accordance with the invention, that includes servers, and a mobile handset.

FIG. 1 illustrates an example of an embodiment of a system 10 in accordance with certain embodiments of the invention. In this embodiment, content management server 15 has access to, and may receive, content from RSS feed 11, podcast 12, and video podcast 13, as examples. This access may be through one or more networks, such as the Internet, for example. Content management server 15 is connected to or in communication with content database 14, and also to or with user management server 17, in this embodiment, which may be connected to or in communication with user database 16, for instance. Communication between any of these components may be through a network such as the Internet, as an example, or through a direct connection. In various embodiments, a "server" may consist of one or both of user management server 17 and content management server 15. In the embodiment illustrated, content management server 15, user management server 17, or both, may communicate with mobile handset 19, for example, through wireless gateway and transmission tower 18. FIG. 1 shows one handset 19, but in many embodiments, there may be a plurality of or many handsets 19, for example, for different users, which may all be served by one or more of servers 15 and 17, for example.

In some embodiments, to make a request for content, mobile handset 19, or a user of mobile handset 19, may communicate with or send a message to content management server 15. In some embodiments, this may involve communicating with the wireless transmission tower (of 18), which gets converted by the wireless gateway (of 18) to internet protocol and submitted to content management server 15, user management server 17, or both, for example. In particular embodiments, content management server 15, user management server 17, or both requests some or all pending pieces of content, and delivers them back to mobile handset 19 (once again via wireless gateway and wireless transmission tower 18).

Figure 2:
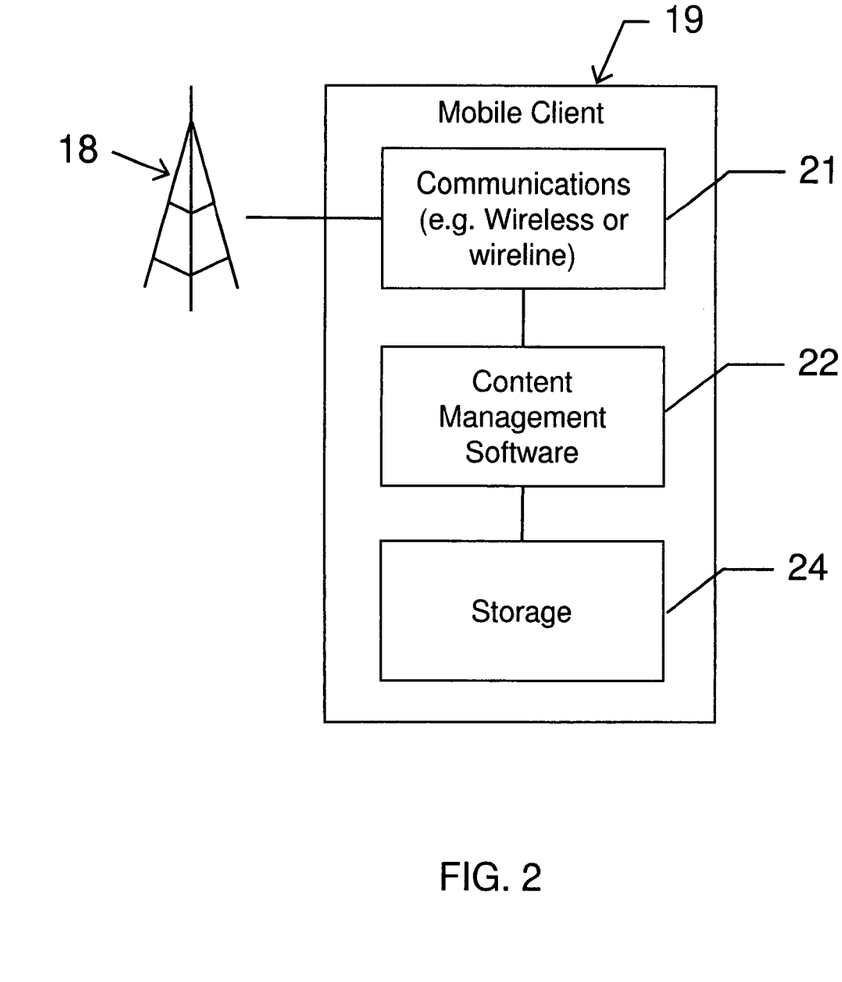
FIG. 2 is a block diagram of the mobile handset of FIG. 1, that illustrates an example of an embodiment of the mobile handset in greater detail.

FIG. 2 illustrates an example of an embodiment of mobile device, mobile handset 19, showing content management software 22, which may be an RSS reader, for example. Content management software 22 may communicate with or send messages to an external server (e.g., to content management server 15 shown in FIG. 1) via the communications component 21, which, in various embodiments, may be a wireless network such as 802.11, Bluetooth or GPRS, for example. Handset 19 or communications component 21 may communicate via wireless gateway and wireless transmission tower 18, for instance. In other embodiments, a user or client device analogous to handset 19 may connect to a network, such as the Internet, by another method, such as a hard wired connection, for example. Handset 19, in this embodiment, also include storage 24, which may be used to store content, for other purposes, or both, and may be relatively limited in capacity, in some embodiments.

An RSS feed is a example of a piece of content that a user may subscribe to, for instance, through content management software 22 on mobile device 19. Content, such as an RSS feed, may contain any number of items, such as articles, and items or articles may be added to or removed from an RSS feed at any time. Articles or items may refer to enclosures or parts, in some embodiments, which may be references to other pieces of content, which may include audio files, image files, video files, or a combination thereof, for example. In many embodiments, items, articles, or both, may have a publication date associated with them allowing them to be sorted chronologically or given priority based on age. In instances where no publication date is provided by a piece of content such as an RSS feed, a publication date may be determined independently by the system, in some embodiments, or the date that the content or RSS feed is received may be used.

In particular embodiments of a mobile device 19 for receiving content through a wireless communication network, the mobile device 19 may include content management software 22 having instructions to transmit (e.g., up-to-date) information from the mobile device 19 to a content management server 15 via the wireless communication network (e.g., through wireless gateway and communications tower 18). In some such embodiments, the information identifies a quantity of content that the mobile device 19 is prepared to receive. Such software (e.g., 22) may also include instructions to receive a select set of content at the mobile device 19 from the management server 15 via the wireless communication network (e.g., through wireless gateway and communications tower 18), for instance, as described herein. In some embodiments, the instructions to transmit the (e.g., up-to-date) information and receive the select set of content may be repeated, at least a plurality of times. In some embodiments, the select set of content may be repeated many times, for example, every half hour, every hour, several times per day, daily, several times per week, or weekly, for instance.

In various embodiments, the content comprises a plurality of articles and the content management software 22 further contains instructions to assign a higher priority to more-recent articles than to older articles. In addition, in some embodiments, the content management software 22 further contains instructions to assign a higher priority to unread articles than to articles that have been read, to assign a higher priority to saved articles than to unread articles, or both.

Figure 3:
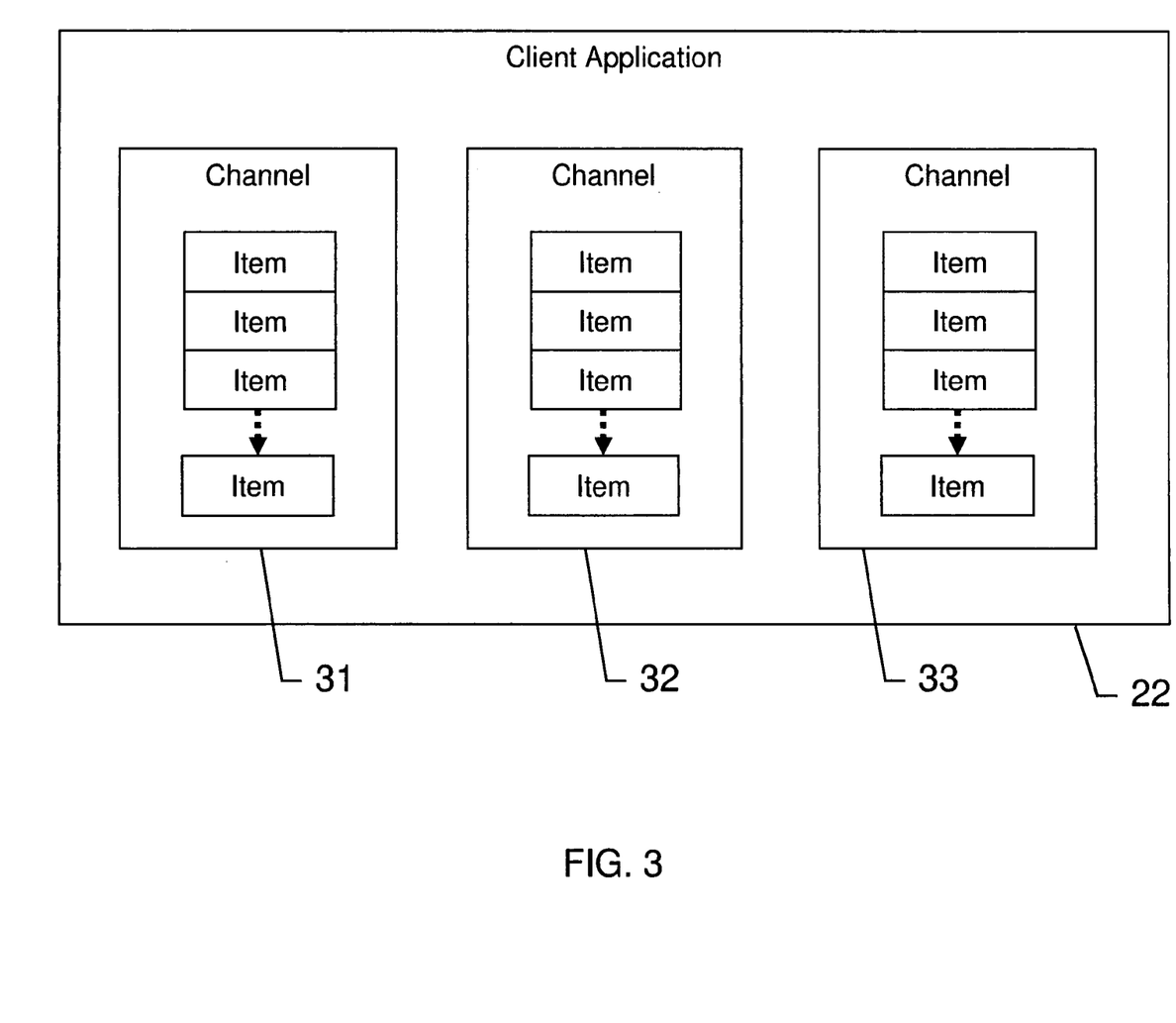
FIG. 3 is a block diagram illustrating an application that may be found on the mobile handset shown in FIGS. 1 and 2, which illustrates that content may include different channels and items in some embodiments of the invention.

Turning now to FIG. 3, in some embodiments, the client application, such as content management software 22, includes instructions to receive content in a plurality of channels, for example, channels 31, 32, and 33. In some embodiments, each channel may include a plurality of items, as shown. In different embodiments, different numbers of channels may exist, channels may have different numbers of items, or both. In various embodiments, some or all of the items may consist of a number of parts. For example, in some embodiments, some or all of the items may include a title, a short description and a long description. In some embodiments, items may include text, pictures, audio files, video, etc., which may be assigned different levels of priority, in some embodiments.

Further, in some embodiments, the content management software 22 may further contain instructions to sort previously received content according to priority and delete at least some of the lowest priority content to make room for the select set of content. In some embodiments, the content management software 22 contains instructions to sort the previously received content in a plurality of channels, where each channel has a limit for a minimum quantity of content.

Figure 4:
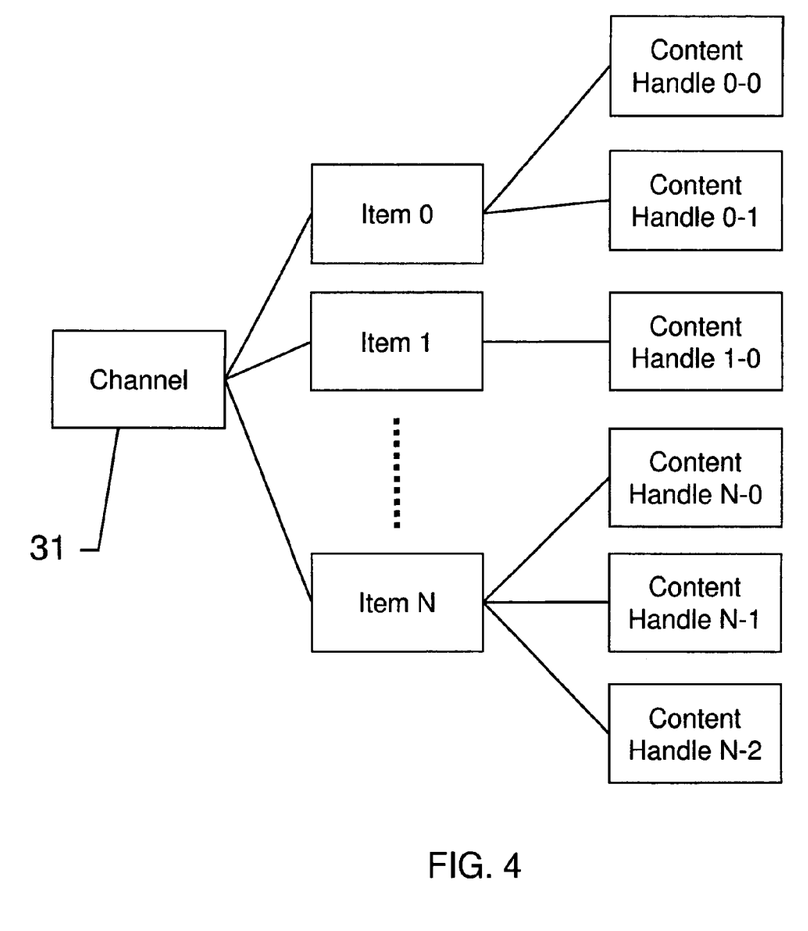
FIG. 4 is a block diagram illustrating an example of items and handles of one of the channels shown in FIG. 3, in an example of an embodiment of the invention.

Further, in a number of embodiments, the content comprises a plurality of items, at least some of which have a plurality of parts, and the content management software 22 contains instructions to organize the items into handles, each handle representing at least one part of an item. FIG. 4 illustrates an embodiment wherein channel 31 comprises content items 0 to N, and each content item shown has at least one handle. Content item N, in this example, has three handles, N–0 to N–2. In addition, in some embodiments, the content management software 22 contains instructions to assign a priority to each of the handles for some or all of the items, and for at least some such items, the priority assigned to one handle is different than the priority assigned to another handle for the same item. Even further, in some embodiments, the content management software 22 further contains instructions to sort the handles according to priority and delete at least some of the lowest priority content to make room for the select set of content. Further still, in some such embodiments, the content management software further contains instructions to fetch a part of an item from content management server 15 (e.g., from content database 14) when the user requests the part and the handle has been deleted or when the user requests the part and a pointer to content referenced by the handle has been deleted.

Figure 5:
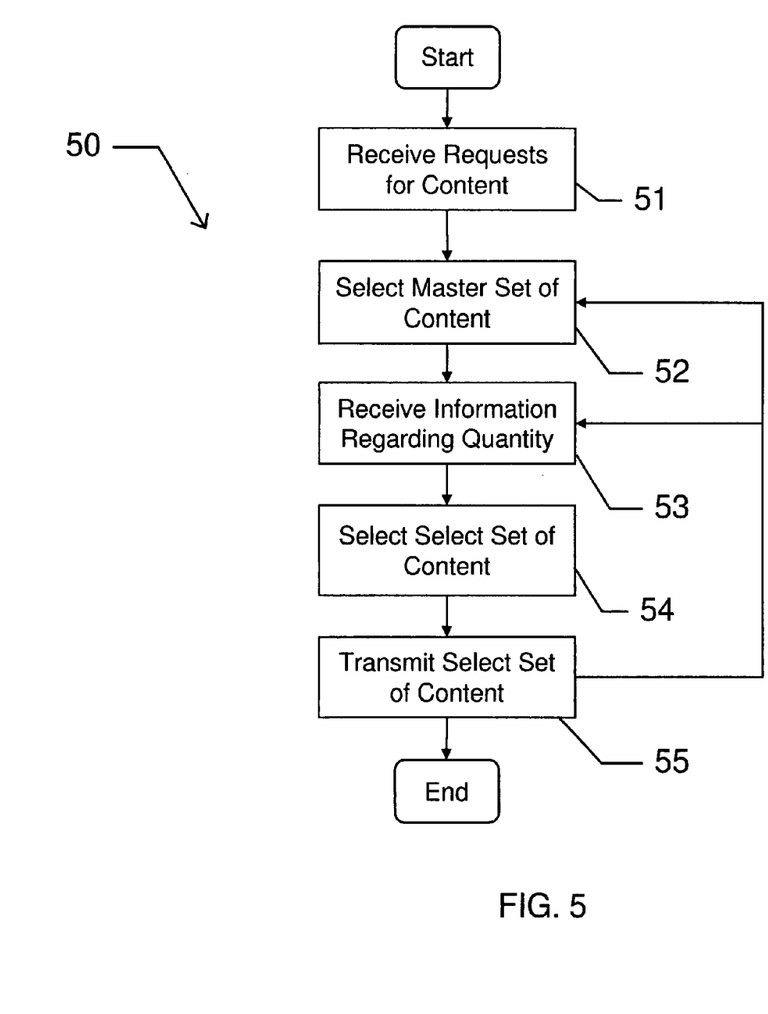
FIG. 5 is a flow chart illustrating an example of a method of delivering content, for instance, to constrained mobile devices, in accordance with an embodiment of the invention.

In addition to equipment, systems, software, and instructions, the invention provides various methods. FIG. 5 illustrates an example of a method in accordance with the invention that may be performed, for example, by content management server 15. FIG. 5 is an example of a method of delivering content to a plurality of mobile devices, for instance. In various embodiments, such a method may include at least certain steps, such as, for example, a step of receiving requests for content (step 51). Such requests may be received, for instance, from at least some of users of a number of mobile devices 19, and each request may include criteria for selecting content. In various embodiments, these requests for content or criteria (e.g., received in step 51) may include subscriptions, such as those described herein. In some embodiments, content on particular subjects, from particular sources or authors, containing particular keywords, from particular sources, having particular characteristics, or the like, may be requested. In certain embodiments, for at least some of the mobile devices 19, the step of receiving requests for content (step 51) includes receiving identification of a plurality of channels. Such channels may include different subscriptions, different publications, content on different subjects or containing different keywords, etc.

Certain methods, such as method 50, may also include (e.g., for each of the mobile devices 19), one or more steps of receiving information regarding a quantity (step 53), for example, of information to be received by the mobile device 19. In some embodiments, up-to-date information may be received (step 53) from mobile device 19 regarding a quantity of content that mobile device 19 is prepared to receive. In various embodiments, up-to-date information may be in real time, in substantially real time, or within a half our or an hour old, for example. As used herein, up-to-date information is no longer than one hour old.

Information regarding quantity (e.g., received in step 53) may include a quantity of content, a number of articles, a number of items, a number of parts of items, a quantity of available memory or storage (e.g., within storage 24) that mobile device 19 has, has available, or that is willing to be committed to content or to new content, for example. In a number of embodiments, the step of receiving the (e.g., up-to-date) information regarding quantity (step 53) includes receiving from each of the mobile devices 19 an indication of a maximum number of items to be transmitted (e.g., in step 55), an amount of memory (e.g., storage 24) of the mobile device 19, a minimum number of items to be transmitted for each of a plurality of channels, a last item received by the mobile device 19 in a previous step of transmitting a select set of content (step 55) to the mobile device 19, or a combination thereof, for example.

Method 50 also includes, for example, a step of selecting a select set of content (step 54). In many embodiments, the select set of content may be selected (step 54) using the requests for content (e.g., received in step 51) or criteria and the information regarding quantity (e.g., received in step 53), for instance. In various embodiments, the step of selecting a select set of content (step 54) includes selecting content corresponding to a plurality of channels. Thus, content may be selected (step 54) from different subscriptions, on different topics, identified in different keyword searches, etc. In some embodiments, the step of selecting a select set of content (step 54) includes selecting a plurality of articles, for example, news articles, which may include text, pictures, sound, video, links, and the like. In certain embodiments, each article or some articles have a title, a short description, a long description, or a combination thereof, for example. Further, in a number of embodiments, the step of selecting a select set of content (step 54) involves giving priority to content based on age, such that newer content is given higher priority.

In addition, method 50 includes a step of transmitting the select set of content (step 55), for example, from content management server 15 to mobile device 19. In many embodiments, method 50 may also involve repeating at least a plurality of times the steps of receiving the (e.g., up-to-date) information (step 53), selecting the select set of content (step 54), and transmitting the select set of content (step 55).

Further, in some embodiments, content management server 15, for example, may look for postings of content after receiving the information regarding quantity (step 53), for instance, as part of the step of selecting the select set of content (step 54). But in other embodiments, a method, such as method 50, may include a step of a content management server (e.g., 15) selecting a master set of content (step 52), which may be based on the requests for content (step 51) or criteria, for example. In some embodiments, at least some of the master set of content is selected (step 52) based on the requests for content (e.g., received in step 51) or criteria before the step of receiving the (e.g., up-to-date) information regarding quantity (step 53) occurs, after which the (e.g., up-to-date) information is used to choose part of the master set of content to form the select set of content (e.g., in step 54) to send to the mobile device 19 (e.g., in step 55). The master set of content (e.g., selected in step 52) may be stored in content database 14, for example, by content management server 15, for instance.

In particular embodiments, for at least some of the mobile devices 19, the step of receiving requests for content (step 51) includes receiving identification of a plurality of channels, the step of receiving requests for content (step 51) includes receiving identification of a minimum quantity of content desired for each of the channels, and at least some of the master set of content is selected (step 52) based on the requests for content (e.g., received in step 51) or criteria before the step of selecting the select set of content (step 54). In addition, the (e.g., up-to-date) information regarding quantity (e.g., received in step 53) may be used (e.g., in step 54) to choose part of the master set of content (e.g., selected in step 52) to form the select set of content (e.g., selected in step 54) to send (e.g., in step 55) to the mobile device 19.

In many embodiments, the step of selecting a select set of content (step 54) includes selecting content corresponding to the plurality of channels, and the step of transmitting the select set of content (step 55) includes transmitting at least the minimum quantity of content desired for each of the channels. And in some embodiments, method 50 further includes (e.g., as part of step 54 or 55, or as another step) identifying to not be delivered in the future, all of the master set of content (e.g., selected in step 52) that is not initially selected to form the select set of content (e.g., in step 54).

In some embodiments, the steps of receiving the (e.g., up-to-date) information (step 53), selecting the select set of content (step 54), and transmitting the select set of content (step 55), are performed without being initiated by the user at the mobile device 19 at the time the select set of content is delivered to mobile device 19. On the other hand, in a number of embodiments, the step of transmitting the select set of content (step 55) is initiated by content management server 15 based on new content being available. Further, in some embodiments, the steps of receiving the up-to-date information (step 53), selecting the select set of content (step 54), and transmitting the select set of content (step 55), are performed periodically, for example, at substantially regular intervals of time. Further still, in some embodiments, the steps of receiving the up-to-date information (step 53) and transmitting the select set of content (step 55), are initiated by the user through the mobile device 19 when the user desires the select set of content (e.g., transmitted in step 55). In certain embodiments, the steps of receiving the up-to-date information (step 53) and transmitting the select set of content (step 55), are initiated by the user through the mobile device 19 for a single channel when the user desires the select set of content for that single channel. And in some embodiments, the step of transmitting the select set of content (step 55) is restricted to that same single channel.

Still further, in some embodiments, at least some of the mobile devices 19 have a particular amount of memory or storage (e.g., storage 24 shown in FIG. 2), and an indication of the amount of memory or storage 24 for at least some of the mobile devices 19 may be included in the requests for content (e.g., received in step 51) or criteria, in the (e.g., up-to-date) information regarding quantity (e.g., received in step 53), or both. Further, in some embodiments, the content includes a plurality of items, at least some of which include a plurality of parts. And in a number of embodiments, for more than one of the mobile devices 19, the step of selecting the select set of content (step 54) includes selecting a portion of the parts of the items based on the indication of the amount of memory. In various embodiments, different parts may be given different levels of priority, which may be based on importance, file size, file type, or age, for example.

In some such embodiments, at least some of the items within the select set of content (e.g., selected in step 54) include at least a title and a description. In some embodiments, if the amount of memory (e.g., storage 24) is less than a predetermined threshold, the step of transmitting the select set of content (step 55) involves transmitting only the title of each item within the select set of content (e.g., selected in step 54). And in some embodiments, at least for some of the mobile devices 19 wherein the amount of memory or storage 24 is less than the predetermined threshold, the description of at least one item may be held, for example, by content management server 15 in content database 14, and may be transmitted upon (e.g., only upon) demand from the user through the mobile device 19, for example, rather than automatically sending the actual description in step 55). Even further, in certain embodiments, at least some of the items within the select set of content (e.g., selected in step 54) include more than one lengths of description, for instance, (at least) a short description and a long description. In some embodiments, the long description (e.g., of at least one item) may be transmitted upon (e.g., only upon) demand from the user through the mobile device 19 (e.g., rather than being transmitted automatically in step 55), for example, for a certain availability or size of memory or storage 24. In some embodiments, the long description may be held until demanded, while the short description may be transmitted (e.g., in step 55) to the mobile device 19.

Describing now some additional specific examples of the invention, in a number of embodiments, mobile device 19 may have, at some point, connected with the server (e.g., 15, 17, or both) and allowed the user to request or subscribe to content (e.g., RSS feeds) (e.g., step 51) which may later be delivered (e.g., in step 55) to mobile device 19. In some embodiments, a user may request or subscribe (e.g., step 51) to content in other ways, for example, through a desk top or laptop computer operating through the Internet, by phone, by e-mail, by text message, etc. In different embodiments, a user may request content (e.g., step 51) from a particular source, of a particular periodical, on one or more particular subjects, having particular keywords, etc. Prior to a mobile device 19 making a request to update content (e.g., a request to select content in step 54, transmit content in step 55, or both), the content management server 15 may be independently collecting content (e.g., in step 52) such as articles that the client has subscribed to (e.g., in step 51) that have yet to be delivered to the client.

The mobile device 19 stores an integer number, in some embodiments, representing a maximum number of articles that it is permitted to store, ($a_{max}$). In some embodiments, the mobile device 19 may request an update from the server (e.g., may request step 55 be performed, for instance, by server 15, 17, or both), which may be initiated automatically, by the device software (e.g., by content management software 22, by software on content management server 15, or by a scheduled update, for example) or manually by a person (e.g., by the user).

For example, in some embodiments, the mobile device 19 sends to the server (e.g., 15, 17, or both) three values (e.g., received by server 15 in step 53). One of these three values, in some embodiments, is an integer representing the number of available "slots" (e.g., in storage 24) for articles on the mobile device 19. In various embodiments, available slots refers to the total maximum number of article permitted on the mobile device 19 minus (subtract) the number of saved articles on the mobile device 19 (e.g.: $s_n = a_{max} - a_{saved}$). Another of the three values mentioned, is an integer representing, in certain embodiments, the minimum number of articles preferred in a channel ($a_{min}$). In some embodiments, this integer may be the same for all channels, while in other embodiments, a user may select a potentially different minimum number of articles for each channel. The third of the three values mentioned is a Boolean, in some embodiments, indicating whether the user or client wants to receive only the newest articles if more articles are available than can be transmitted in a single transaction (e.g., in step 55).

When the server (e.g., 15) receives a request or information (e.g., step 53) from the mobile device 19, in particular embodiments, it counts how many articles are pending delivery to the mobile device 19 ($a_{pending}$) via the clients subscribed RSS feeds, for instance. In different embodiments, these articles or information identifying them may be stored on content database 14 (e.g., in a master set of content selected in step 52), or may not yet have been downloaded by server 15, for example, from RSS feed 11 and the like. In certain embodiments, if $a_{pending} <= s_n$ then the server (e.g., 15) sends (e.g., in step 55) all pending articles to the client (e.g., to mobile handset 19), because the client has room for them all. In other words, the master set of content selected in step 52 is transmitted in step 55, and the step of selecting a select set of content (step 54) involves selecting all of the master set of content (e.g., from step 52).

On the other hand, if $a_{pending} > s_n$ then, in various embodiments, if the client prefers to receive (e.g., in step 55) only the newest articles (e.g., ignoring the older articles), then in the pending articles (e.g., in the master set of content selected in step 52), content management server 15 may count the number of articles in each channel ($a_{channel,n}$). And from all channels, in this embodiment, where $a_{channel,n} >= a_{min}$, (e.g., content management server 15) removes the oldest articles from the list (e.g., in step 54) pending delivery (e.g., in step 55) to the mobile device 19, and in some embodiments, does not ever deliver them (e.g., in a repeated step 55).

Otherwise, if the client prefers to receive (e.g., in step 55) older articles before the newer articles, then, for example, content management server 15 may count the number of pending articles in each channel ($a_{channel,n}$), in some embodiments. Content management server 15 may then (e.g., in step 54), at least for all channels where $a_{channel,n} >= a_{min}$, remove (e.g., in step 54) the newest articles from the list (e.g., from the master set of content selected in step 52) pending delivery (e.g., in step 55) to the mobile device 19, but may put the removed articles back in the pending delivery list (e.g., back into the master set of content of step 52), for instance, after the select set (e.g., selected in step 54) has been sent (e.g., in step 55) to the mobile device 19 so the articles that were not already sent are delivered on the next update request (e.g., when step 55 is repeated). If there are no channels where $a_{channel,n} \geq a_{min}$ then content management server 15 would not remove articles from any channel in this embodiment.

In further examples of embodiments, a mobile device 19 stores a minimum article limit per channel and a global maximum article limit. In some such embodiments, the mobile device 19, at the client, keeps items ordered, in preparation for candidate deletion, based on the following algorithm, for example. First, read articles are considered older, or of a lower priority, than unread ones. Second, unread articles are considered older, or of a lower priority, than saved ones. Further, if read/unread/saved status is the same, then the articles are ordered or prioritized by the publish date, or if the publish date is not available, then by the date the articles arrived may be used, for example, at content management server 15 or mobile handset 19.

In some such embodiments, when new articles arrive on the mobile device 19 (e.g., transmitted in step 55), if the global maximum limit is not reached, then the articles are added to the appropriate channel. On the other hand, if the global maximum is reached, then the article is added to the appropriate channel and the mobile device 19 selects articles for deletion based on the following algorithm, for example. First, each channel is requested for it's "n" oldest or lowest priority items, where "n" is the number of articles to delete, for example, as described above (e.g., all read, but not saved, items may be considered older or of a lower priority than any unread items). If a channel has less than the minimum limit, then it returns null (e.g., for "n"). Further, in this embodiment, if removing "n" items will cause the channel to have less than the minimum limit, then the channel returns the oldest or lowest priority "n—minimum limit" items. In addition, items received from each channel are kept in an auto sorted vector, in this embodiment, and the oldest "n" items are deleted. But saved items, in this embodiment, are considered sacred and are never deleted automatically (e.g., without specific instructions to delete by the user).

Yet another embodiment of the invention uses two modes. The mode is chosen dynamically depending on how much storage is available on the device (e.g., mobile handset 19). Thus, some mobile devices 19 may be operating in one mode, while other mobile devices 19 are operating in a different mode. While other numbers may be used in other embodiments, 100 k has been chosen in this embodiment to be a threshold, as an example. For devices (e.g., mobile handset 19) with less than 100 k of storage (e.g., storage 24), this embodiment operates in a low memory mode. For devices with more storage, this embodiment operates in what will be called a normal mode. Other embodiments may have different modes or a different number of modes.

In this embodiment, there exists a client device (e.g., mobile handset 19) running content management (e.g., RSS reader) software 22, and there exists a server (e.g., content management server 15) on the Internet that contains information specific to that client device (e.g., 19), which may include account information, subscribed RSS feeds, etc, for example. The server (e.g., content management server 15) maintains the list of subscribed RSS feeds (e.g., channels) for all clients that connect, and delivers the individual articles/items to the clients (e.g., to mobile handset 19), for instance, as they appear in the channels on the Internet.

Referring once again to FIG. 3, in this embodiment, the content management software or client application 22 contains a number of channels 31, 32, and 33, for example, and each channel contains a number of items. In some embodiments, an item contains a title and a description, for instance. In low memory mode, in this embodiment, the client device (e.g., 19) stores application settings, which may include a maximum number of articles/items that are permitted to be stored, and an article/item transmission index (which is initialized to 0 in this embodiment). In addition, in this embodiment, the client device (e.g., 19) stores, for each channel, an identification of the channel, the first 100 characters of the channel title, and the count of unread items in the channel (which changes dynamically as the user opens items). Furthermore, in this embodiment, the client device (e.g., 19) stores, for each item in a channel, the identification of the item, the identification of the channel this item belongs to, the first 100 characters of the item title, and a flag to denote whether this item is read or unread.

In this embodiment, when the content management software or client application 22 is run is low memory mode, the following behavior occurs. First, a screen displays a list of channel titles and corresponding unread article counts, from the information that is currently resident on the device (e.g., on mobile handset 19). Second, the application 22 makes contact with the server (e.g., with content management server 15) to synchronize the subscription list (if it is different from what is stored on the server for that account) (e.g., providing instructions or requests for content received in step 51 shown in FIG. 5). In this embodiment, the application 22 will then request from the server (e.g., 15) all available article titles and identifications. In this embodiment and mode, item descriptions will not be delivered at this stage, for example, to save space (e.g., of storage 24 shown in FIG. 2). Further, in this embodiment, an appropriate transmission index is passed from the device 19 to the server (e.g., 15) so the server knows where to begin sending items. This index may include, for example, a "counter" to indicate where in the list of items an update was last completed.

In this embodiment, the server (e.g., 15) first returns to the client (e.g., to mobile handset 19) the number of titles it will be returning. In this embodiment, the device application 22 auto-deletes "items" (which may just be a title) from device storage 24, so that at most the device application 22 is storing the maximum number of allowable items, using the auto-deletion algorithm of this embodiment. Then, in this embodiment, the new items are delivered to the device 19, the unread counts are updated on the device 19, and the transmission index on the device 19 is updated once the entire update is complete. In this embodiment, the user can select channels (e.g., 31, 32, and 33 shown in FIG. 3) in the user-interface and open them for viewing. This displays the list of item titles (which have already been retrieved) for this channel. At this point, the application 22 may, in some embodiments, choose to fetch the descriptions for all items in this channel, in anticipation of the user opening many of the items.

Also in this example of an embodiment, the user can open an item in a channel. When this happens, if the description for the item has not already been loaded, the application demands or fetches the description (e.g., from content database 14, via content management server 15). In this embodiment, a dialog is presented to the user "please wait . . . " and the description is fetched, and finally displayed to the user (e.g., on mobile handset 19). This description may be the short description, for example. After viewing the description, in this embodiment, the user can also request the item's "full article" which is a longer and more complete version of the item description (e.g., the long description). In this embodiment, a dialog is presented to the user "please wait . . . " and the full article is fetched (e.g., from content database 14, via content management server 15) and displayed to the user (e.g., on mobile handset 19).

When the user closes the user-interface (e.g., on mobile handset 19) for viewing an item, in this embodiment, the storage (e.g., 24) for the description and full article are immediately released. In this embodiment and mode, every time the user views a description or full article, the application 22 makes a request to the network (e.g., to content management server 15) to fetch the content. In other words, there is no caching of such content in this mode of this particular embodiment. In addition, in this embodiment, in low memory mode, there is no option to save content. Other embodiments may have a limited option to save content.

The normal memory mode of this embodiment operates similarly, with the following differences. First, instead of delivering only item titles on a fetch, both titles and descriptions are delivered to the client when updating (e.g., in step 55 shown in FIG. 5). Second, in this mode of this embodiment, descriptions (e.g., short descriptions) are cached (e.g., in storage 24 of mobile handset 19). Third, in this mode of this embodiment, full article content (e.g., long descriptions) is optionally cached (e.g., in storage 24). Further, in this mode of this embodiment, items can be saved, and more items can be stored (e.g., in storage 24).

Through an auto-deletion algorithm of this embodiment, items are automatically deleted based on priority, with low priority items being deleted first. In this embodiment, unopened items have higher priority to be retained, and opened items have a lower priority to be retained. In addition, items are sorted by date, with older items having lower priority than newer items in this embodiment, and saved items are never automatically deleted. In this embodiment, each channel has a minimum article count, to ensure high-volume channels do not completely starve low-volume channels of articles.

The transmission index mentioned above is used in this embodiment for synchronization (redelivery) of items. The synchronization may be necessary, for example, when a connection is lost during transmission (e.g., the server 15 delivered 250 items [e.g., in step 55] but the client 19 received only 100), or if the client (e.g., mobile handset 19) crashed during processing new items or the user pulled the batteries out or terminated the application 22 without saving (e.g., similar to above). Another potential use for synchronization, in this embodiment, is when the client (e.g., mobile handset 19 or content management software 22) is reinstalled. In this embodiment, if the client has no items, its local transmission index is 0.

In this embodiment, the server (e.g., 15) has a list of items (e.g., the master set of content of step 52 of FIG. 5) to be delivered to the client (e.g., to mobile handset 19). When the client calls for new items, for example, the server (e.g., 15) takes a subset of all new client items and decides which items to send (e.g., in step 54 of FIG. 5) based on an "anti-starving" delivery algorithm and transmission index. In this embodiment, each item which the server (e.g., 15) decides to send to the client gets assigned a sequential transmission index. Specifically, the index starts from 1 and is incremented with every item sent to the client, in this particular embodiment. The index is saved on the server (e.g., 15), in this embodiment, with each client item, and the client receives the item along with corresponding transmission index. In this embodiment, the client stores (e.g., in storage 24) the highest received index, and the next time the client (e.g., content management software 22) calls for items, it sends the highest received transmission index. In this embodiment, the server (e.g., 15) then goes through all client items and assumes that all client items with a transmission index higher than the one provided by the client are new, and the delivery algorithm is applied and the process starts over again.

In yet another embodiment, described as another example of the invention, content is organized into structures, and these structures may be divided into atomic units. Users are often not interested in the entire structure, and are only interested in bits and pieces of it. Some embodiments of the invention have the ability to separate these content parts and deliver and manage the content, for example, in an optimal way for a mobile service where the mobile device (e.g., handset 19) has constrained memory and storage (e.g., 24).

Consider the following RSS feed, for example, described in XML:

```
<rss>
    <title>My Feed</title>
    <copyright> © 2006 Virtual Reach</copyright>
    <description>
    Virtual Reach, creator of mobile applications
    </description>
    <item>
    <title>Item 1</title>
    <description>This is item 1</description>
    <link>http://www.server.com/url</link>
    <enclosure url="http://www.a.com/file.mp3"
length="4314254"
type="audio/mpeg"/>
    </item>
</rss>
```

This feed is itself content, but is subdivided into smaller units. The feed's title, the copyright, the description, each item, the item's title, the item's description, and the audio enclosure, etc., are all atomic units of content that can be subdivided in this example.

In particular embodiments, a user subscribes to content channels (such as RSS feeds) (e.g., received in step 51 shown in FIG. 5). The service (e.g., via content management server 15) delivers content from these channels to the user's device (e.g., to mobile handset 19). In a particular embodiment, when the content arrives on the device (e.g., 19), it is subdivided into interlinked atomic parts using "handles". The handles, in this embodiment, are sorted into a priority queue. Some of the atomic parts don't actually contain the content, in this embodiment, they simply contain a placeholder for the content, and knowledge of how to fetch the real content when required. FIG. 4 illustrates an example of how a content channel 31 may be divided into content items and handles.

As another example, a RSS article containing an image and a link to an audio file can be divided into a basic article (e.g., title, author, date, etc.), a short description, the full article (e.g., long description), an image, and an audio file, for instance. Upon receiving this RSS content, the device application (e.g., client management software 22 shown in FIG. 2) may, for example, receive the basic article content and place it in the priority queue, receive the short description and place it in the priority queue, create a placeholder for the full article and place it in the priority queue, receive the image and place it in the priority queue, and create a placeholder for the audio file and place it in the priority queue.

In some embodiments, there are various sorting criteria that affect how two handles are sorted relative to each other. The sorting criteria may include, for example, opened vs. unopened, content type, fetch date, content size, priority metric, saved flag, protected flag, or a combination thereof. In many embodiments, saved and protected items are not placed in the priority queue, as they can never be selected for auto-deletion. In some embodiments, saved items are essentially protected items that the user has specially requested be protected. In some embodiments, they are placed in a special saved folder. In a number of embodiments, protected items are also never selected for auto-deletion. In some embodiments, they are used for special feeds that represent lists of things instead of streams of information. For example, a feed representing a grocery list or address book should not have items automatically deleted.

In particular embodiments, opened items are assigned an aspect priority of 0, and unopened items are assigned an aspect priority of 1. Next, the various aspects are assigned floating point numbers, in some embodiments, where 0 is considered low priority and 1 is considered high priority. In a particular embodiment, for content type, the following floating point values are assigned: user interface, 1.0; basic article, 0.9; short description, 0.8; long description, 0.7; images, 0.6; audio enclosure, 0.2; video enclosure, 0.1; and other enclosure, 0.1, for example. In this embodiment, for fetch date, a number between 0 and 1 is assigned representing the aging of the handle. Aging can be set globally for all handles (e.g., all handles age linearly from 1 to 0 over 30 days) or aging can be handled by types or even feed sources. For example, audio enclosures could age quickly (e.g., over 3 days), and descriptions could age slowly (e.g., over 30 days). Alternately, audio enclosures in a certain feed could age very slowly (e.g., 15 days), while audio enclosures in feeds in general could age very quickly (e.g., 2 days). In a formula provided as an example:

Priority=1−(clamp(age of handle/age_duration)), where age of handle is the difference between the current date and the date the item was originally published; clamp implies that if the result is greater than 1 it is set to 1, and if the result is less than 0 it is set to 0. In this formula, if the age of a an item was 30 days, and the age duration was 30, the priority would be set to 0. If the age was 0 (a brand new item), the priority would be set to 1.

In certain embodiments, content size affects how things are inserted in the priority queue. For example, larger atomic blocks may be given (e.g., by default) a lower priority so they can be selected for auto-deletion more quickly than smaller atomic blocks. In particular embodiments, a number between 0 and 1 is assigned based on the size. In this embodiment, 0 represents a size equal to or exceeding a maximum preferred size for an atomic piece of content. And 1 represents a size equal to 0 bytes (e.g., the number approaches 1 as the size approaches 0). In a particular embodiment, the maximum preferred size for an atomic piece of content is 10% of the devices (e.g., mobile handset 19's) total storage (e.g., 24). In a particular example of a formula, for instance:

priority=1−(clamp(content_size/device_storage, 0, 1)), where clamp implies that if the result of the operation is less than 0, it is set to 0, and if the result is greater than 1, it is set to 1.

In various embodiments, a priority metric is a prioritization fudge-factor that the device application (e.g., content management software 22) can use to artificially boost (or reduce) priority of specific items in special cases. In different embodiments, the priority metric can be assigned any value by the application (e.g., by content management software 22). In many embodiments, for example, higher values increase the priority and defer auto-deletion and lower values (e.g., including negative values) decrease the priority and accelerate auto-deletion.

Based on the various criteria, in particular embodiments, a prioritization value for each handle is produced with the following weighted formula:

$$w_1o+w_2t+w_3f+w_4s+p$$

where
w is a weighted factor for each prioritization criteria;
o is the number for opened vs. unopened;
f is the number representing the fetch date aging;
s is the number representing the content size; and
p is the number representing the prioritization factor.

Fetching certain bits of content can be restricted, in some embodiments, by the type of available network. For example, when operating on a GPRS network, no audio or video can be received. But when the device (e.g., mobile handset 19) switches to a cable or WiFi network, then images and audio can be received in many embodiments. In addition, in some embodiments, certain parts of content are fetched automatically, and for particular parts, only a handle to the content is created so that it can be fetched later. In some embodiments, the client (e.g., content management software 22) decides whether to auto-fetch content depending on a number of variables. One such variable, in certain embodiments, is the amount of storage (e.g., 24) available on the device (e.g., 19), for example. When available storage is low, for instance, the client (e.g., content management software 22) can reduce the number of things that are auto-fetched, in some embodiments. In some embodiments, the user may request that certain channels always auto-fetch some of the content (e.g., full descriptions for a certain news channels).

An example of some sample code is as follows:

```
// thrown when a handle is unable to fetch its data
// contains a message describing the reason for the
// problem.
exception ContentFetchException
// use an interface here so we can use existing data
// structures as handles
interface Handle {
    // should fetch if it needs to, or throw an exception
    public Object getData( ) throws ContentFetchException
        // get the size of the data this handle references
        public int getSize( )
        // used by getData
        public void fetch( ) throws ContentFetchException;
        // release my memory and remove me from the priority
queue
        public void release( );
        // return true if my data has been fetched, false if
        // if it needs to be fetched
        public boolean isAvailable( );
        // return true if my data can be fetched now
        public boolean canFetch( );
}
// A HandleSorter compares two handles and orders them, allowing
// the priority queue to do its work. The result of this comparison
// depends on the specific heuristic for priority
interface HandleSorter
{
    public int compare(Handle h1, Handle h2);
}
// thread-safe singleton
class HandlePriorityQueue
{
    public static final getInstance( ) { ... }
    private HandlePriorityQueue( )
    // add a Handle to the queue, using the default sorter
    public void add(Handle h)
    // remove a specific Handle from the queue
    public void remove(Handle h)
    // free x bytes of data from the queue
    public void free(int x)
}
```

Figure 6:
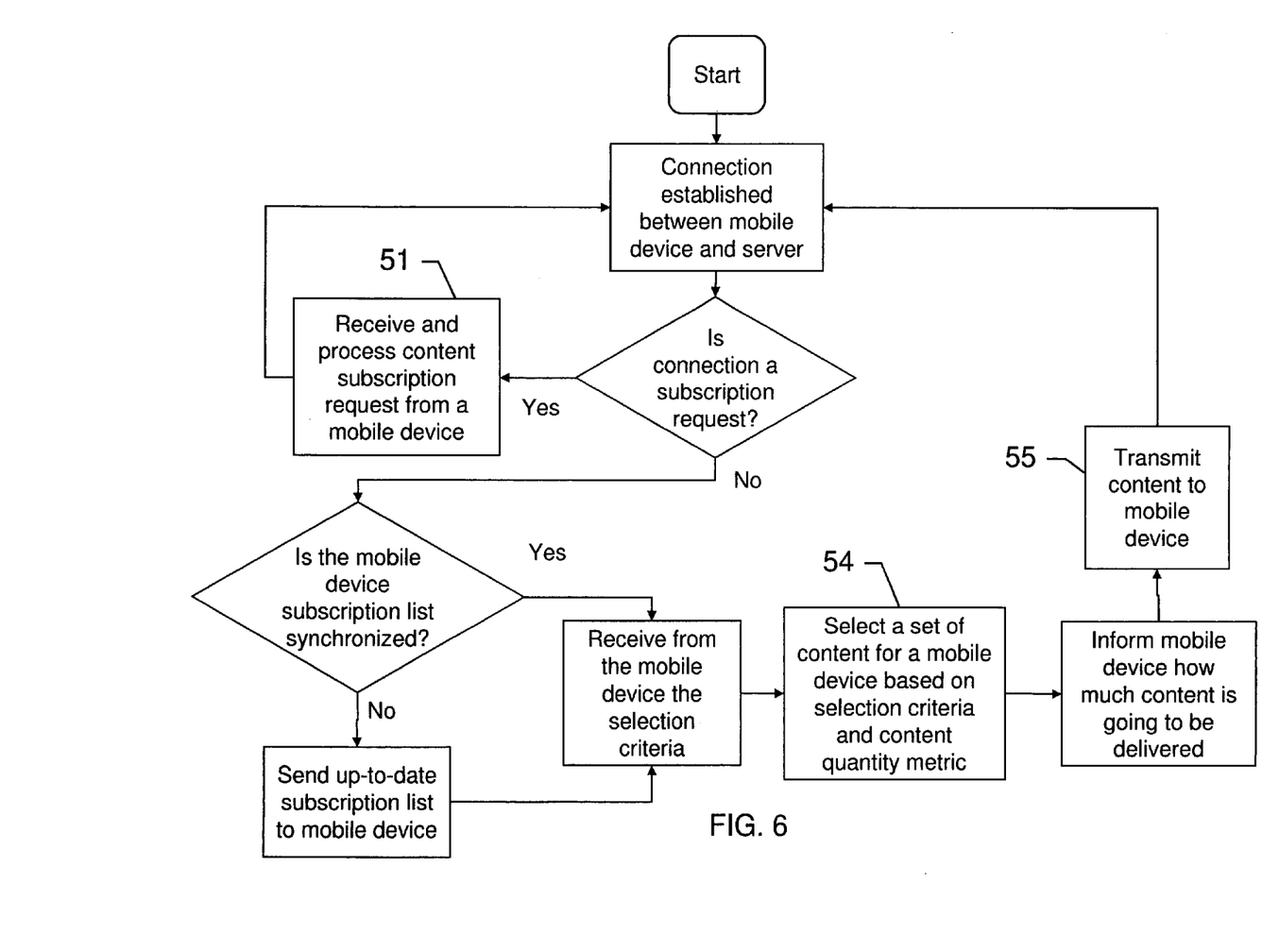
FIG. 6 is a flow chart illustrating another example of a method of delivering content, for instance, to a mobile device, in accordance with an embodiment of the invention.
Figure 7:
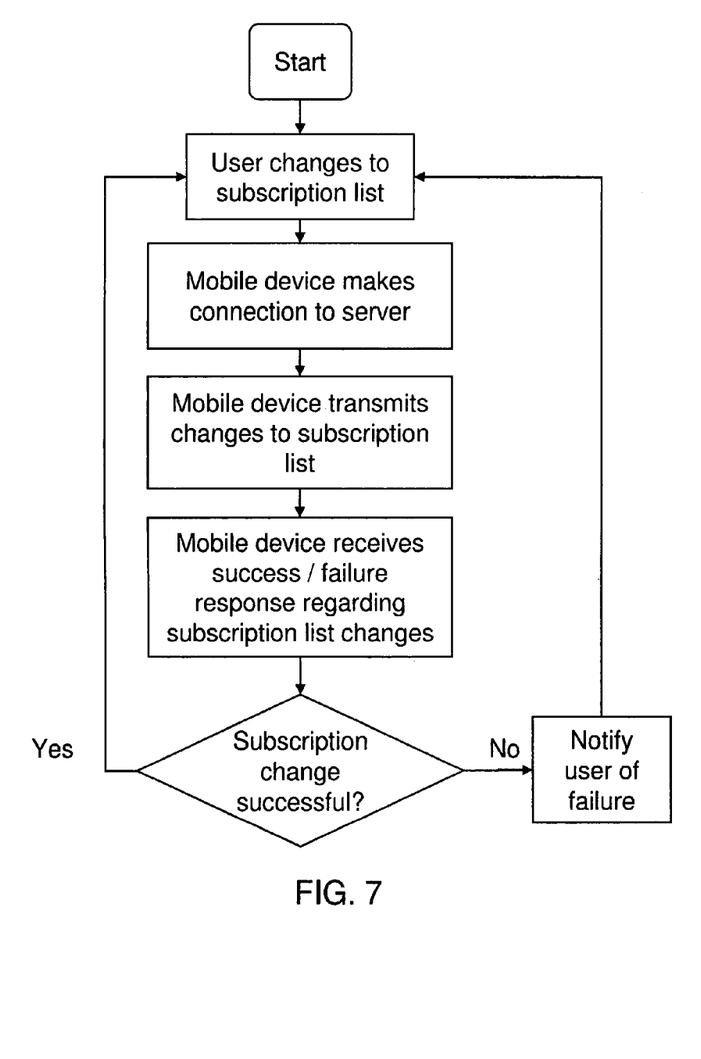
FIG. 7 is a flow chart illustrating an example of a method of requesting content or changing a subscription list, for instance, with a mobile device, in accordance with an example of an embodiment of the invention.
Figure 8:
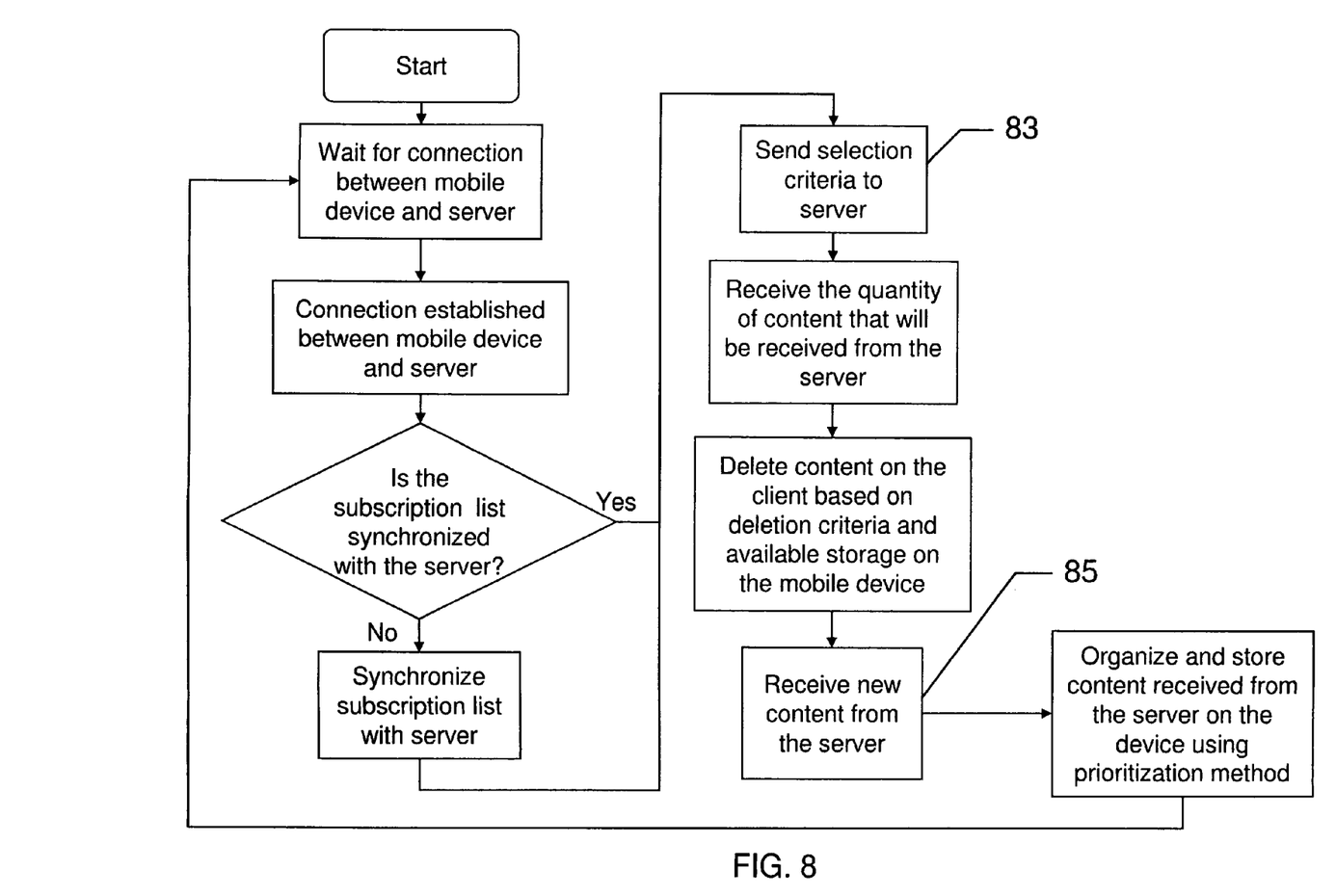
FIG. 8 is a flow chart illustrating an example of a method of receiving content, for instance, with a mobile device, in accordance with an example of an embodiment of the invention.

FIGS. 6 to 8 illustrate various additional examples of methods in accordance with the invention. Specifically, FIG. 6 illustrates another example of a method employed by content management server 15, for instance. The mobile device mentioned in FIG. 6 may be mobile handset 19, for example. Steps 51 of receiving requests for content, 54 of selecting a select set of content, and 55 of transmitting content (previously discussed with reference to FIG. 5), are shown in FIG. 6, along with other steps that may be included in various embodiments of the invention. FIG. 7 illustrates an example of a method of changing a subscription list, which is an example of steps associated with one embodiment of requesting content (e.g., received in step 51 shown in FIG. 5 and described above with reference thereto). In FIG. 7, the mobile device may be mobile handset 19, for example, and the server may be content management server 15, both shown in FIG. 1, for instance.

FIG. 8 illustrates an example of steps taken by a mobile device (e.g., mobile handset 19) when receiving content from a server (e.g., from content management server 15). In this particular embodiment, the step of sending selection criteria to the server (step 83) corresponds to the step of receiving information regarding quantity (step 53) of FIG. 5. Similarly, in this particular embodiment, the step of receiving new content from the server (step 85) corresponds to the step of transmitting the select set of content (step 55) shown in FIG. 5. Other steps shown in these figures may be found in various embodiments of the invention.

Some elements, parameters, measurements, functions, components, and the like may be described herein as being required, but may only be required in certain embodiments. Further, benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Orders and sequences (e.g., of steps) herein are presented as examples, but are not intended to indicate the only order sequence that may accomplish the desired purpose, unless specifically stated as such. Further, no element described herein is required for the practice of the invention unless expressly described as "essential" or "critical".

What is claimed is:

1. A mobile device for receiving content through a wireless communication network, the mobile device comprising content management software comprising instructions to:

transmit up-to-date quantity information from the mobile device to a content management server via the wireless communication network, wherein the quantity information relates to available memory and identifies a quantity of the content that the mobile device is prepared to receive;

receive a select set of the content at the mobile device from the management server via the wireless communication network, wherein the select set of the content received is determined using the quantity information; and repeat at least a plurality of times the instructions to transmit the up-to-date quantity information and receive the select set of content;

wherein the content comprises a plurality of items having a plurality of parts, and wherein the content management software contains instructions to organize the plurality of items into content handles, each content handle representing at least one part of one of the plurality of items;

wherein the content management software contains instructions to assign a priority to each of the content handles for a particular item of the plurality of items, wherein a first priority is assigned to a first content handle for the particular item and a second priority is assigned to a second content handle for the particular item; and wherein the content management software further contains instructions to sort the content handles according to priority and delete at least some of the content-based on the priority to make room for the select set of content.

2. The mobile device of claim 1, wherein the content management software includes instructions to receive the content in a plurality of channels, each channel comprising a plurality of items, each item comprising a title, a short description and a long description.

3. The mobile device of claim 1 wherein the content management software further contains instructions to sort the previously received content according to priority and delete lower priority-content to make room for the select set of content.

4. The mobile device of claim 1 wherein the content comprises a plurality of articles and the content management software further contains instructions to assign a higher priority to recently received articles than to previously received articles.

5. The mobile device of claim 1 wherein the content comprises a plurality of articles and the content management software further contains instructions to assign a higher priority to unread articles than to articles that have been read.

6. The mobile device of claim 1 wherein the content comprises a plurality of articles and the content management software further contains instructions to assign a higher priority to saved articles than to unread articles.

7. The mobile device of claim 1 wherein the content management software further contains instructions to sort the previously received content in a plurality of channels, each channel having a limit for a minimum quantity of content.

8. The mobile device of claim 1 wherein the content management software further contains instructions to fetch one of the plurality of parts from the content management server when the mobile device requests the one of the plurality of parts and the content handle has been deleted.

* * * * *